Inventor
Clifford B. Shreve
By Liverance and
Van Antwerp
Attorneys

Patented Nov. 1, 1949

2,486,686

UNITED STATES PATENT OFFICE 2,486,686

SLIDING AND SWINGING HOOKED END FASTENER

Clifford B. Shreve, Niles, Mich., assignor to Tyler Fixture Corporation, Niles, Mich., a corporation of Michigan Application January 15, 1945, Serial No. 572,842

4 Claims. (Cl. 292—111)

1

This invention is directed to a very simply constructed and readily and easily positively operated locking clamp for connecting two members together in a relation in which they are held pressed against each other at adjacent sides. It is among the objects and purposes of the present invention to provide a locking clamp of the character noted in which the releasable engagement of the two parts, one on one member and one on the other, may be effected with said members separated a short distance from each other, and then by manually operating one of said parts of the locking clamp in the proper direction the two members are snugly engaged together at adjacent sides and will remain securely held. A further object is to provide the construction with safeguards in operation such that the drawing together of the two members which are to be thus brought into pressing or clamping engagement with each other shall not be broken or released by a too far manual operation; and further, the clamp is provided with means for insuring the proper positioning of the parts thereof before connecting the clamp parts together so that a proper and operative engagement of the parts may be had with an insurance that the connecting and clamping together of the two members shall be attained. An understanding of the invention and of a preferred construction embodying it may be had from the following description, taken in connection with the accompanying drawing, in which, Fig. 1 is an elevation showing the manually operable hook member of the clamp in its disconnected position.

Like reference characters refer to like parts in the different figures of the drawing.

Figure 1:
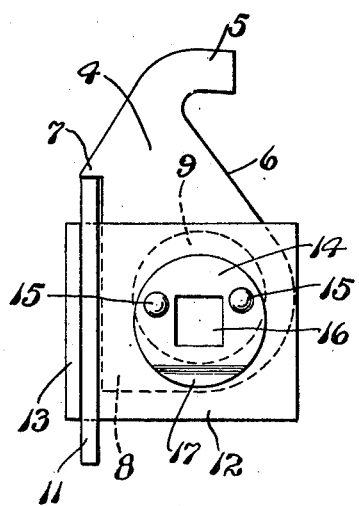

The members 1 and 2 which are to be brought together in clamped relation with adjacent sides in pressure engagement may be of many and various types and character. One of said members, such as the member 2, has a pin or rod 3 connected thereto with its axis at right angles to the plane in which the member 2 is positioned.

With this pin or rod 3 a hook portion of the clamp is adapted to be releasably connected.

2

Said hook portion includes a body 4 made of flat metal terminating at one end in a downturned hook 5 with a recess for receiving the pin or rod 3, the under edge of the body 4 inclining downwardly and away from said recess as indicated at 6. At its upper side the body 4 is formed with an upwardly extending projection providing a vertical shoulder 7, when the body of the hook member is located horizontally, and at its upper corner at the end of the body opposite the hook 5 it is of a right angle shape as indicated at 8, the upper side of the body between said corner at 8 and the projection at 7 lying in a generally horizontal position when the hook is engaged with the rod or pin 3 as shown in Fig. 3.

Figure 3:
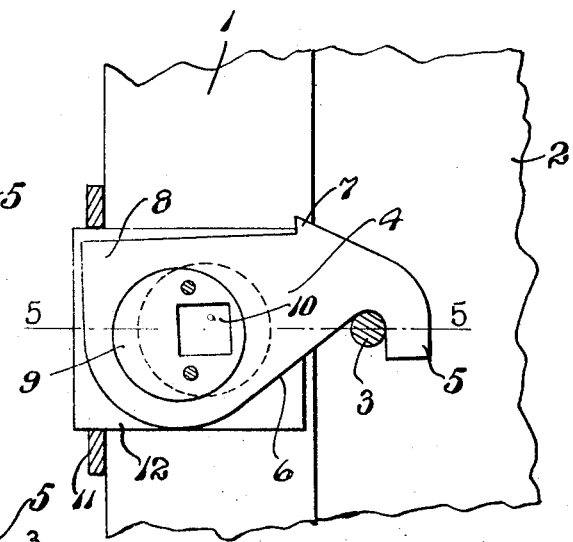
Fig. 3 is a view similar to Fig. 2 showing the clamp fully operated and the members brought into clamped relation to each other.

The body 4 of the hook element of the clamp has a circular opening in which a circular disk 9 of flat metal, the thickness of which is slightly greater than the thickness of the metal of which the body 4 is made, is located rotatably in said opening and having a square opening 10 therethrough the center of which is offset from the center of the disk 9 (see Fig. 3).

Figure 5:
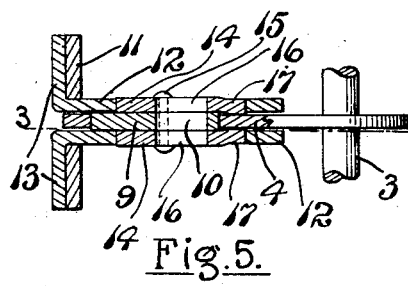
Fig. 5 is a horizontal section substantially on the plane of line 5—5 of Fig. 3.

A base 11 of flat metal is located against the opposite side of the member 1 and has a rectangular opening therethrough for the passage of arms 12 of brackets, from which feet 13 are turned at right angles (Fig. 5) to bear against the outer side of the base 11. The arms 12 are spaced apart a distance from each other so that the hook body 4 with its disk 9 may be inserted therebetween. The arms 12 also have circular openings therein in each of which a circular disk 14 is positioned each having a square opening 16 the center of which is coincident with the center of its disk 14. The disks 9 and 14 are riveted together by means of rivets 15 extending therethrough with all of the openings 10 and 16 in alinement as shown in Fig. 5 and this unit comprised of the three disks may be termed a rotor. Adjacent one side the disks 14 are pressed and forced inwardly as indicated at 17 to bear with frictional engagement against opposite sides of the body 4 of the hook member of the clamp (see Fig. 5).

Figure 2:
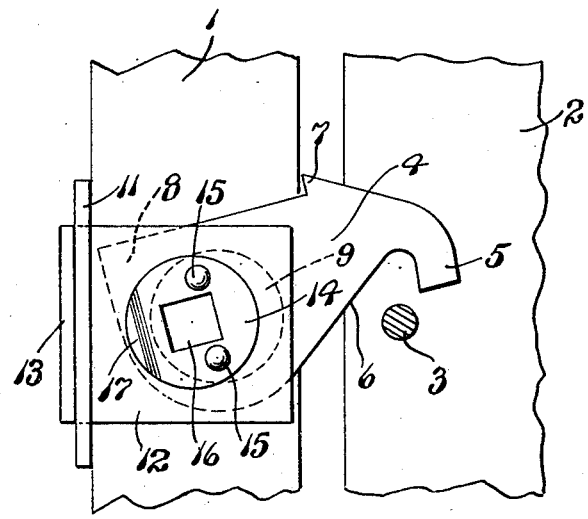
Fig. 2 is an elevation showing said hook portion of the clamp in operative association with the member which is to be brought into pressure engaging and clamped relation with another member and with the hook at the position immediately before it engages with a cooperating part on the other member.
Figure 4:
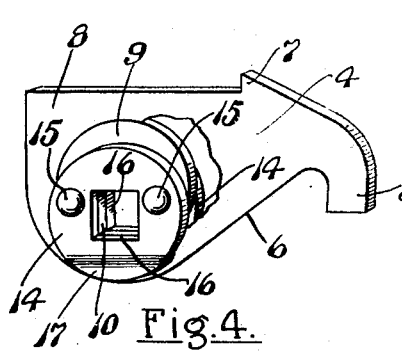
Fig. 4 is a perspective view with some parts broken away illustrating the hook and its mounting.

With the two members 1 and 2 positioned a short distance apart as shown in Fig. 2 by introducing a suitable implement into the alined openings 10 and 16 in the disks 9 and 14 said disks may be turned whereupon the frictional engagement of disks 14 against the body 4 of the hook member will cause it to move and it may be turned to the position shown in Fig. 2; and by a continuance of the turning movement the recess of the hook 5 will receive the pin or rod 3 and thereafter the continued turning of the disk 9 will cause the hook to be moved bodily to the left with a drawing of the member or part 2 into snug clamping engagement with the member or part 1. The clamping of the parts 1 and 2 together may be effected before the maximum turning of the disk 9 has been accomplished, for example, as shown in Fig. 3. If, however, a continuance of the turning of the disk 9 should follow until there would be a release because the centers of the opening 10 and the disk 9 should pass below a horizontal line connecting them, further turning movement is stopped by the corner portion 8 of the body 4 coming against the upper end of the opening in the base 11, it being the design of the structure that at the maximum clamping position, the disk 9 connected to and turning with the disks 14, the centers of which are fixed, will have moved the body 4 upwardly to the extreme position that it can go and in which position said body 4 is stopped as described.

To release the clamp it is necessary merely to reverse the turning movement of the connected disks 9 and 14. The first effect of such movement is to move the body 4 to the right and such movement is accompanied by an upward turning movement thereof by reason of the inclined edge 6 riding upon the pin or rod 3. After the hook portion of the body 4 has been raised above the pin or rod 3 as in Fig. 2 the parts may be separated. However, when such separation occurs the pin or rod 3 and the body 4 will not be in the position shown in Fig. 2, but the hook part of the clamp will have been moved bodily to the left from such position, such that should a reconnection be attempted with the member 2 spaced a short distance from the member 1 as in Fig. 2, or any substantial portion of such distance, the end of the downwardly turned hook 5 would strike against the upper side of the pin or rod 3 and the pin would not be received in the recess of the hook. In order to insure that such shall not be the action the parts are to be turned until they are in the position shown in Fig. 1, or until the shoulder 7 comes against the base 11. The hook body 4 is turned to such position by the frictional engagement of the inset parts 17 of the disks 14 therewith, and when such position is reached turning of the disks as indicated in Fig. 1, the line joining the center of the opening 10 and the center of the disk 9 being positioned vertically no turning of the disks in a counter-clockwise direction thereafter can occur, and the parts are properly positioned so that when turned in a clockwise direction for engagement of the hook member of the clamp with the pin or rod 3, there will have been a sufficient tolerance provided that a proper reception of the pin 3 in the recess of the hook will occur, providing the two members 1 and 2 which are to be clamped together are brought to any position within a predetermined spaced distance of one to the other.

The construction described is novel and very effective and practical and of a simple and inexpensive nature. I have used it in connecting and clamping sections of refrigerators together. It is however not limited in use to the one place designated but may be applied in many relations.

The invention is defined in the appended claims and is to be considered comprehensive of all forms of structure coming within their scope.

I claim:

1. In a construction as described, a drawing and clamping hook assembly comprising a base adapted to be positioned vertically, having a rectangular opening therethrough, a support comprising two brackets having vertical sides extending through said opening and laterally turned feet bearing against the outer side of the support, a hook member comprising a body of flat metal disposed between said sides of the support and a free end portion extending beyond said sides, said hook member at its free end having a downwardly turned hook form, each of the sides of said support having a circular opening therethrough, and the body of said hook member between said sides of the support also having a circular opening therethrough, circular disks mounted in each of said openings in the sides of the support and body of the hook member, each of said disks having a non-circular opening therethrough, the openings in said disks being in conjunction with each other and the openings in the disks carried by the sides of the support having the centers of said openings substantially coincident with the centers of their respective disks, the opening through the disk carried by the hook member body having its center offset from the center of the disk, and means securing said disks together, whereby turning of the disks by an implement inserted in said openings causes said hook member to be moved in and out with respect to the sides of the support.

2. A construction containing the elements defined in claim 1, said body of the hook member at its upper side between its ends having a shoulder extending vertically when the hook member is in a horizontal position, said shoulder when the body of the hook member is turned to vertical position striking against said support, in which position the disk carried by the hook member is located with its center and the center of the opening therethrough in substantially vertical alinement and with the center of the disk above the center of said opening.

3. A construction as defined in claim 1, said body of the hook member at its free end having a hook end portion which extends downwardly in a substantially vertical direction when the hook is in horizontal position with a recess between it and the body of the hook member, said body of the hook member at its lower edge extending downwardly and away from said recess at an angle to the horizontal when said hook member is in substantially horizontal position.

4. A construction as defined in claim 1, said body of the hook member between said sides and at its upper corner portion, when said hook member is in horizontal position, having a substantially right angle form, said upper corner portion of the hook member coming into stopping engagement with said base when the hook member is turned to horizontal position with the centers of the disk carried by the body of the hook member and the opening through said disk positioned in substantially horizontal alinement.

CLIFFORD B. SHREVE.

REFERENCES CITED

The following references are of record in the file of this patent:

UNITED STATES PATENTS

| Number | Name | Date |
|---|---|---|
| 453,004 | Hix | May 26, 1891 |
| 1,216,414 | Calkins | Feb. 20, 1917 |
| 1,438,757 | Goddard | Dec. 12, 1922 |
| 1,517,995 | Langenau et al. | Dec. 2, 1924 |
| 2,378,654 | Pekny | June 19, 1945 |